US012680661B2

(12) United States Patent
Kim

(10) Patent No.: US 12,680,661 B2
(45) Date of Patent: Jul. 14, 2026

(54) LIGHTING DEVICE FOR VEHICLE

(71) Applicant: HYUNDAI MOBIS CO., LTD., Seoul (KR)

(72) Inventor: Do Hyung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/217,215

(22) Filed: May 23, 2025

(65) Prior Publication Data

US 2026/0002652 A1 Jan. 1, 2026

(30) Foreign Application Priority Data

Jul. 1, 2024 (KR) ........................ 10-2024-0086122

(51) Int. Cl.
*F21S 41/43* (2018.01)
*F21S 41/20* (2018.01)
*F21S 43/20* (2018.01)

(52) U.S. Cl.
CPC ........... *F21S 41/43* (2018.01); *F21S 41/2805* (2024.05); *F21S 43/265* (2024.05)

(58) Field of Classification Search
CPC ....... F21S 41/43; F21S 41/2805; F21S 43/265
See application file for complete search history.

(56) References Cited

U.S. PATENT DOCUMENTS

2010/0066249 A1* 3/2010 Nagafuchi .............. F21S 43/30 362/516
2018/0163942 A1* 6/2018 Salter ..................... B60Q 1/247
2018/0257546 A1 9/2018 Johnson et al.
2019/0323676 A1 10/2019 Heib et al.
2022/0371507 A1* 11/2022 Kim ....................... B60Q 1/076
2024/0101022 A1* 3/2024 Goetzelmann ........ B32B 27/308

FOREIGN PATENT DOCUMENTS

EP 4040041 A1 10/2022
EP 4344949 A1 4/2024
JP 2020059445 A 4/2020
KR 20230095228 A * 6/2023 .............. F21S 41/28
KR 10-2024-0008741 A 1/2024
WO WO-2019048183 A1 * 3/2019 ........ F21S 43/26241

OTHER PUBLICATIONS

English translation of Hyun KR-20230095228-A (Year: 2023).*

* cited by examiner

*Primary Examiner* — Evan P Dzierzynski
(74) *Attorney, Agent, or Firm* — NovoTechIP International PLLC

(57) ABSTRACT

A lighting device for a vehicle includes a housing portion, an outer lens portion coupled to the housing portion and configured to cover an opening provided on the housing portion, a light source portion installed in the housing portion and configured to emit light toward the outer lens portion, and a light-blocking portion provided on the outer lens portion and configured to partially block light emitted from the light source portion.

20 Claims, 15 Drawing Sheets

LIGHTING DEVICE FOR VEHICLE

CROSS-REFERENCE TO RELATED APPLICATIONS

This application claims priority from and the benefit under 35 USC § 119 of Korean Patent Application No. 10-2024-0086122, filed on Jul. 1, 2024, in the Korean Intellectual Property Office, the entire disclosure of which is incorporated by reference for all purposes.

TECHNICAL FIELD

Exemplary embodiments of the present disclosure relate to a lighting device for a vehicle and, more particularly, to a lighting device for a vehicle capable of implementing communication hidden lighting.

BACKGROUND

In general, vehicles are equipped with lighting devices that utilize various light sources, and these lighting devices are appropriately used according to their characteristics based on the installation location and intended purpose thereof. A lighting device for a vehicle includes lighting installed inside the vehicle and lighting installed outside the vehicle. In particular, lighting installed outside the vehicle contributes to the premiumization of the product from a design perspective, so the design and lighting effects of the vehicle's lighting also become increasingly important.

In recent years, the increasing importance of vehicle design performance aligns with the commercialization of electric vehicles and the development of autonomous vehicles. This has enhanced not only the function and performance of the lighting devices for a vehicle but also design aspects thereof, leading to recent advancements in hidden lighting technology.

Hidden lighting substantially contributes to improving the marketability of vehicles by implementing lighting as a design element, thereby creating diverse and luxurious lighting images as well as enhancing sophisticated and advanced image effects in vehicles, especially electric vehicles.

The related art of the present disclosure is disclosed in Korean Patent Application Publication No. 10-2024-0008741 (published on Jan. 19, 2024 and entitled "LIGHTING DEVICE FOR VEHICLE").

SUMMARY

Various embodiments of the present disclosure are directed to providing a lighting device for a vehicle capable of implementing communication hidden lighting.

A lighting device for a vehicle according to the present disclosure includes a housing portion, an outer lens portion coupled to the housing portion and configured to cover an opening provided on the housing portion, a light source portion installed in the housing portion and configured to emit light toward the outer lens portion, and a light-blocking portion provided on the outer lens portion and configured to partially block light emitted from the light source portion.

The light-blocking portion may have the same color as a vehicle body.

The light-blocking portion may have a smaller area than the outer lens portion.

The light-blocking portion may be provided on a first portion of the outer lens portion.

The light-blocking portion may include a light-transmitting portion through which light emitted from the light source portion passes and a non-transmissive portion through which light emitted from the light source portion does not pass.

A plurality of light-transmitting portions may be provided and the plurality of light-transmitting portions may be spaced concentrically and radially.

The light source portion may include a first light source portion configured to emit light toward the light-transmitting portion and a second light source portion configured to emit light toward a second portion of the outer lens portion, excluding the first portion.

The light-blocking portion may include a coating layer applied to a first surface of the outer lens portion or to a second surface positioned to face in a direction opposite to the first surface.

The light-blocking portion may include a film insert-molded onto a first surface of the outer lens portion or onto a second surface positioned to face in a direction opposite to the first surface.

The light-transmitting portion may be formed by laser etching or laser perforation.

The light-blocking portion may be positioned between the outer lens portion and the light source portion.

The lighting device for a vehicle may further include an inner lens portion positioned between the outer lens portion and the light source portion.

The outer lens portion may include a first outer lens portion and a second outer lens portion coupled to the first outer lens portion and configured to have the light-blocking portion.

The first outer lens portion may include a lens body portion coupled to the housing portion and configured to cover the opening and a lens mounting portion recessed on an outer surface of the lens body portion and on which the second outer lens portion is mounted.

The lens mounting portion may have a coupling groove portion recessed on an outer surface thereof, and the second outer lens portion may have a coupling protrusion portion formed to protrude from an outer surface thereof and be inserted into the coupling groove portion.

The housing portion may be mounted on a front portion or a rear portion of the vehicle body.

The lighting device for a vehicle may further include a control unit electrically connected to the light source portion and electrically connected to vehicle electronic components in order to receive operating signals from the vehicle electronic component and control the light source portion.

The control unit may control ON/OFF operation of the light source portion to implement a welcome mode or a goodbye mode of the vehicle based on the vehicle's ignition ON/OFF signal when an operation signal is received from the vehicle electronic component responsible for operating the vehicle's ignition ON/OFF.

The control unit may control ON/OFF operation of the light source portion to implement a daytime driving mode or a nighttime driving mode of the vehicle based on an illumination value received from the vehicle electronic component when an operation signal is received from the vehicle electronic component responsible for detecting external illumination of the vehicle.

The control unit may control ON/OFF operation of the light source portion to indicate the vehicle's stop state when an operation signal is received from the vehicle electronic component responsible for detecting a distance between a pedestrian outside the vehicle and the vehicle.

In the lighting device for a vehicle, the light-blocking portion, in the form of the coating layer or the film with the same color as the vehicle body, is integrated with the first portion of the outer lens portion, and the light-transmitting portion is formed by laser etching or laser perforation on the light-blocking portion, thereby implementing a hidden lighting design.

DETAILED DESCRIPTION

Figure 1:
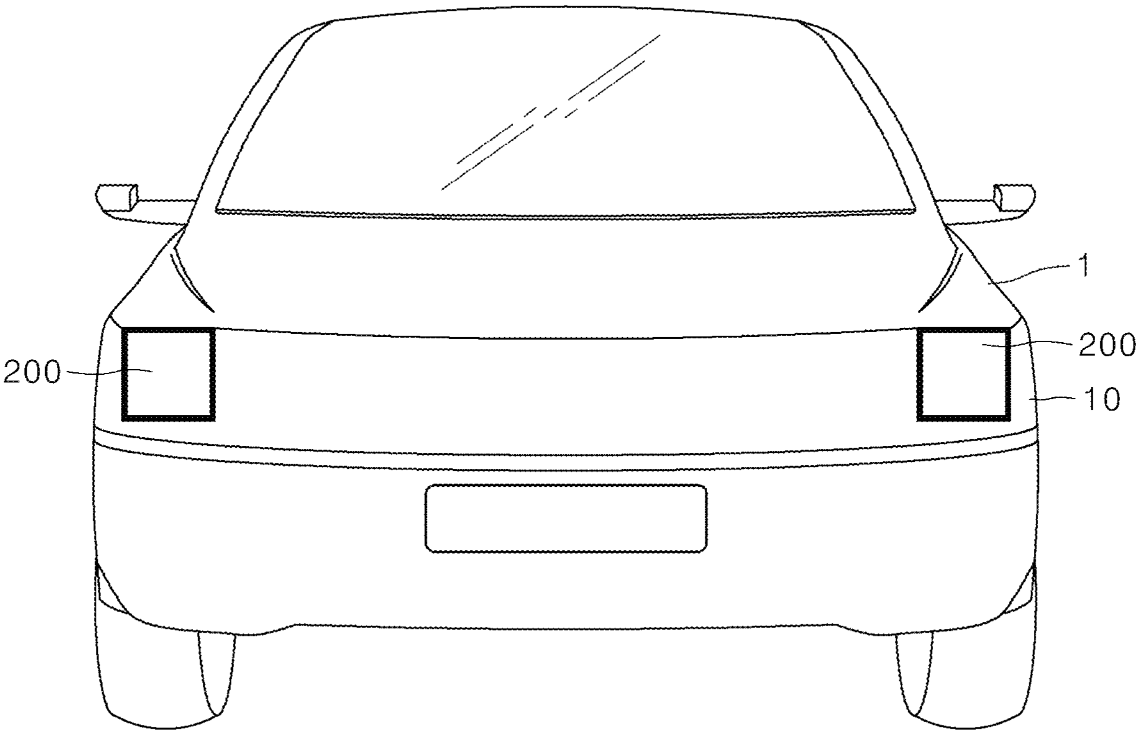
FIGS. 1 and 3 are front views of a lighting device for a vehicle according to a first embodiment of the present disclosure, viewed from the front of a vehicle body.

Embodiments of a lighting device for a vehicle according to the present disclosure will be described hereinafter with reference to the accompanying drawings. In this process, the thickness of lines and the size of elements illustrated in the drawing may be exaggerated for clarity and convenience of description. In addition, the terms used below are defined in consideration of the functions thereof in the present disclosure and may vary depending on the intention of a user or an operator or common practice. Therefore, these terms should be contextually defined in light of the present specification.

Figure 2:
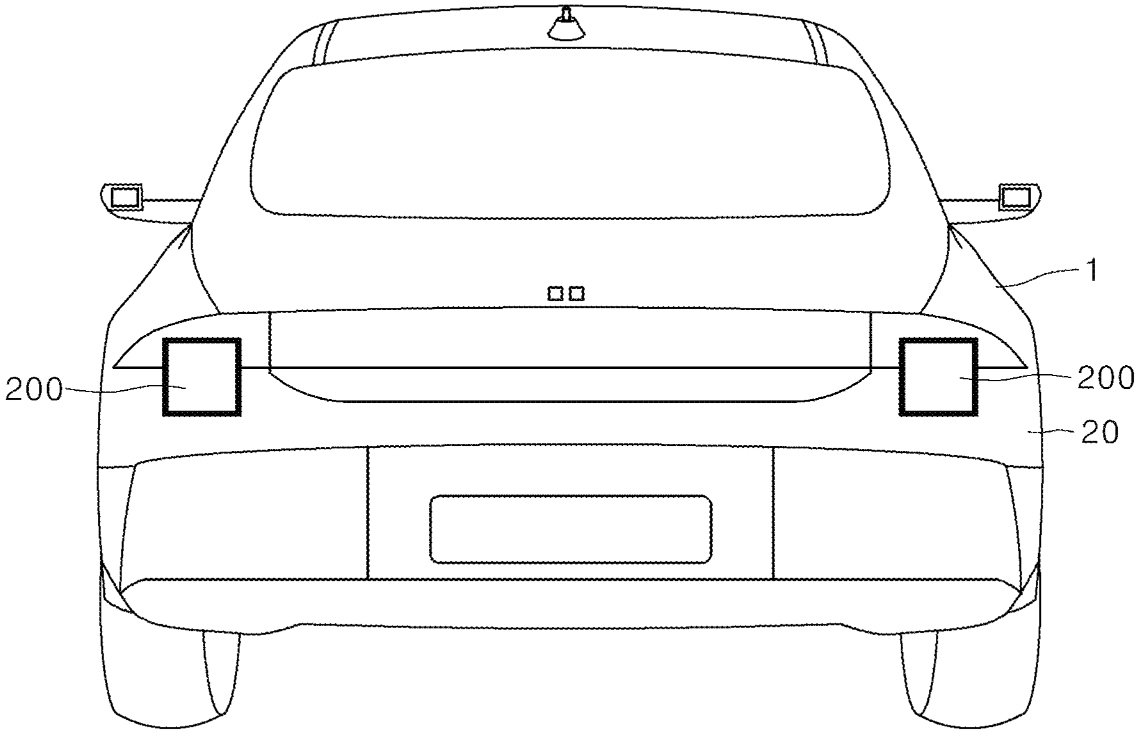
FIGS. 2 and 4 are rear views of a lighting device for a vehicle according to the first embodiment of the present disclosure, viewed from the rear of a vehicle body.
Figure 3:
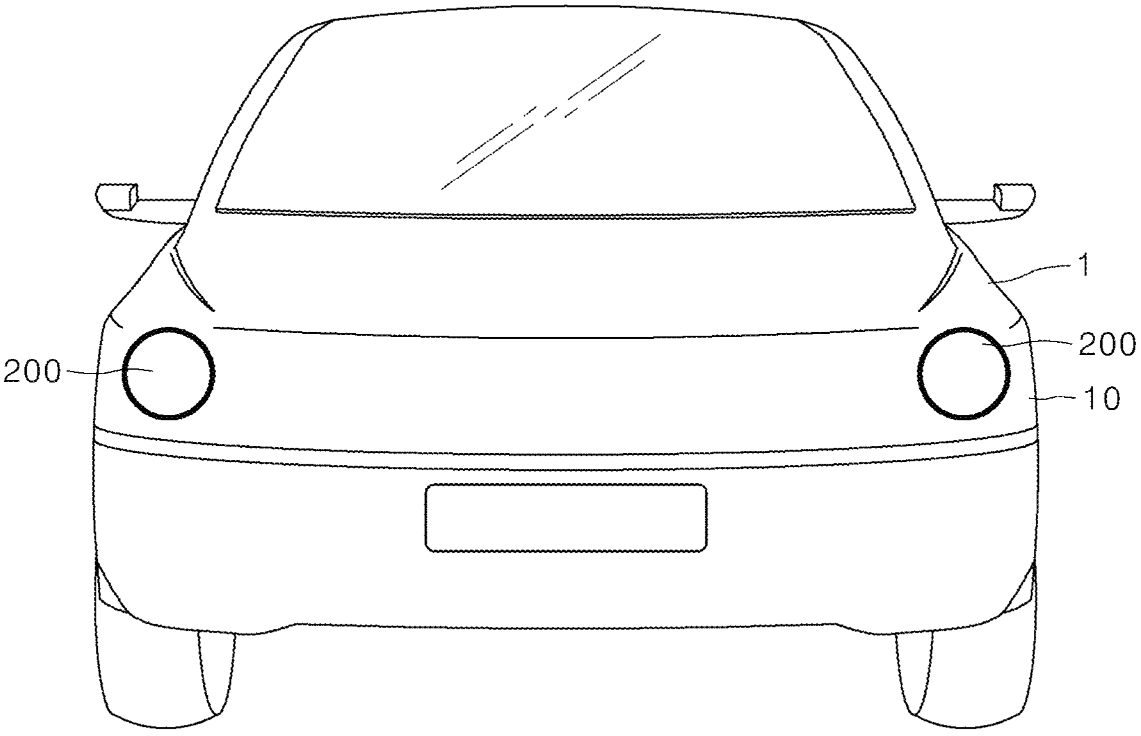
Figure 4:
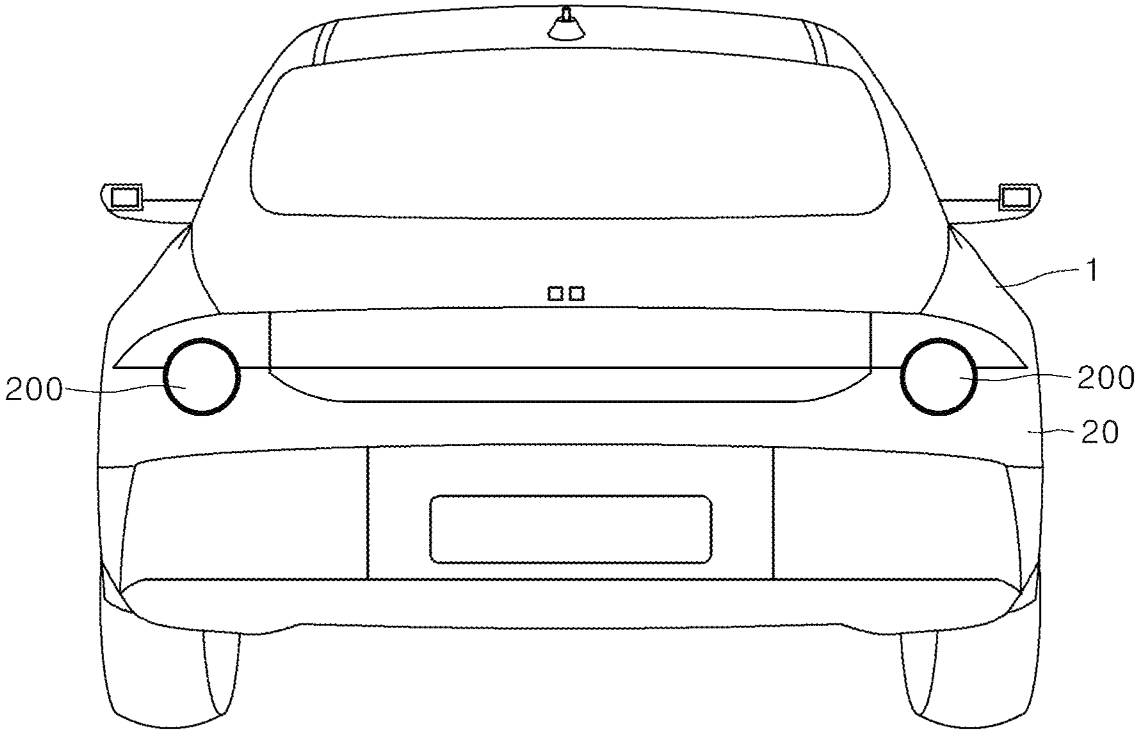
Figure 5:
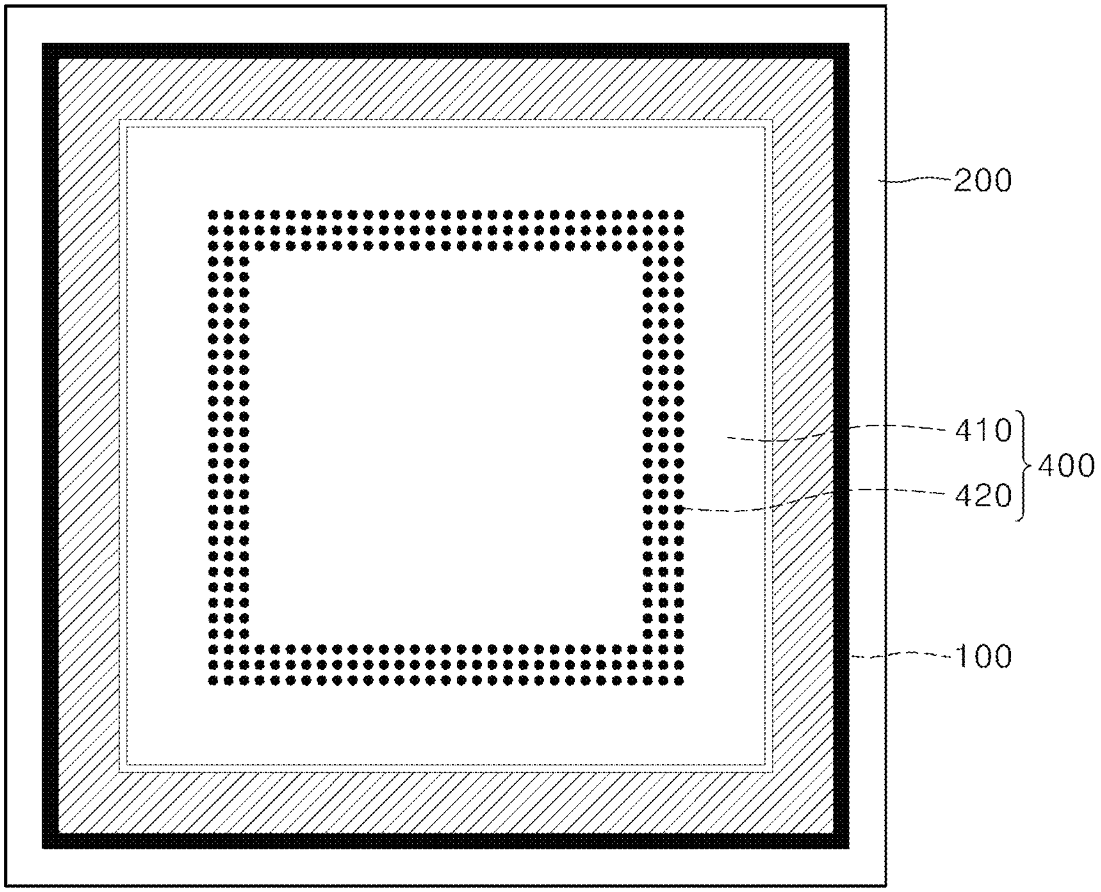
FIG. 5 is a front view schematically showing a lighting device for a vehicle according to the first embodiment of the present disclosure.
Figure 6:
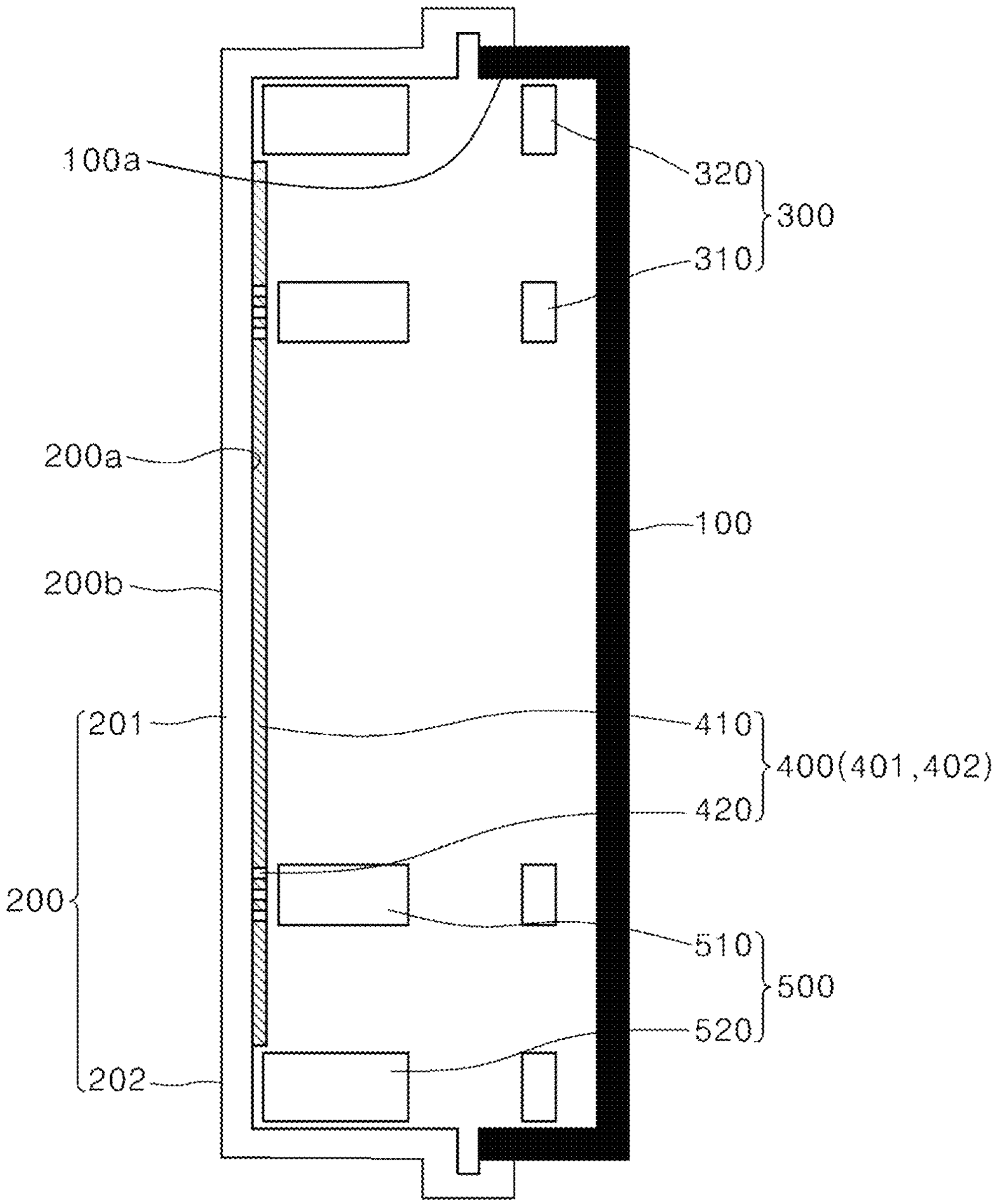
FIG. 6 is a sectional view of one side of FIG. 5.

FIGS. 1 and 3 are front views of a lighting device for a vehicle according to a first embodiment of the present disclosure, viewed from the front of a vehicle body. FIGS. 2 and 4 are rear views of a lighting device for a vehicle according to the first embodiment of the present disclosure, viewed from the rear of a vehicle body. FIG. 5 is a front view schematically showing a lighting device for a vehicle according to the first embodiment of the present disclosure. FIG. 6 is a sectional view of one side of FIG. 5.

Referring to FIGS. 1 to 6, a lighting device for a vehicle according to a first embodiment of the present disclosure includes a housing portion 100, an outer lens portion 200, a light source portion 300, a light-blocking portion 400, and an inner lens portion 500, which will be described in detail as follows.

The housing portion 100 may be mounted to a vehicle body 1. In an embodiment, the housing portion 100 may be mounted on a front portion 10 of the vehicle body 1, which faces the front of the vehicle. The housing portion 100 may be mounted on the bumper or hood side where a headlamp is mounted. The housing portion 100 may be positioned on both sides of the vehicle body 1 in the width direction.

The housing portion 100 may have a box shape with an internal space and be formed with an open front surface, which faces the front of the vehicle body 1.

In another embodiment, the housing portion 100 may be mounted on a rear portion 20 of the vehicle body 1, which faces the rear of the vehicle. The housing portion 100 may be mounted on the bumper or tailgate side where a rear lamp is mounted. The housing portion 100 may be positioned on both sides of the vehicle body 1 in the width direction.

The housing portion 100 may have a box shape with an internal space and be formed with an open front surface, which faces the rear of the vehicle body 1.

The housing portion 100 may have a cross-section that is circular, oval, or polygonal, such as triangular or rectangular with angular corners.

The housing portion 100 may be coated with a pigment of at least one color. The pigment may include black dye. The housing portion 100 may be made black so that when the light source portion 300 is turned off, even if an external light source enters the housing portion 100 through the outer lens portion 200, the interior of the housing portion 100 appears black when viewed from outside the outer lens portion 200.

The outer lens portion 200 may be coupled to the housing portion 100. The outer lens portion 200 may have a substantially plate-like shape and the edges thereof may be secured along the edges of the housing portion 100 in a manner that entirely surrounds the light source portion 300, the light-blocking portion 400, and the inner lens portion 500.

The outer lens portion 200 may be formed in the shape of a planar or curved surface to match the shape of an opening **100*a* formed in the housing portion 100. The outer lens portion 200 may cover the opening 100*a* disposed (or provided) on the front surface of the housing portion 100, which faces the front or rear of the vehicle body 1**.

The outer lens portion 200 may be exposed to the outside and be made of a transparent material that transmits light. For example, the outer lens portion 200 may include plastics such as polycarbonate.

The light source portion 300 may be housed at or installed in the housing portion 100. The light source portion 300 may be securely installed on an inner surface of the housing portion 100. The light source portion 300 may be spaced apart from the outer lens portion 200 and positioned to face the outer lens portion 200.

The light source portion 300 may emit light toward the outer lens portion 200. In detail, the light source portion 300 may emit light in a direction where the outer lens portion 200 is positioned. The light source portion 300 may include a light emitting diode (LED). A plurality of light source portions 300 may be provided. The plurality of light source portions 300 may be spaced apart from each other.

The light-blocking portion 400 may be disposed or provided on the outer lens portion 200. The light-blocking portion 400 may partially block light emitted from the light source portion 300. The light-blocking portion 400 may include a non-transmissive material. The light-blocking portion 400 may have the same color as the vehicle body 1.

The light-blocking portion 400 may have a smaller area than the outer lens portion 200. The light-blocking portion 400 may be disposed or provided on a first portion 201 of the outer lens portion 200. The first portion 201 refers to a central portion of the outer lens portion 200, excluding an edge portion of the outer lens portion 200. A second portion 202 of the outer lens portion 200 refers to an edge portion of the outer lens portion 200, excluding the first portion 201, i.e., excluding the central portion of the outer lens portion 200.

The light-blocking portion 400 may have the shape of a circle, oval, or a polygon, such as a triangle or rectangle with angular corners.

The light-blocking portion 400 may be integrally provided with the outer lens portion 200. The light-blocking portion 400 may be disposed or provided on a first surface 200*a* of the outer lens portion 200. The first surface 200*a* may refer to an inner surface of the outer lens portion 200, which faces in a direction where the housing portion 100 is positioned. A second surface 200*b* of the outer lens portion 200 may refer to an outer surface of the outer lens portion 200 positioned to face in a direction opposite to the first surface 200*a*. In other words, the light-blocking portion 400 may be positioned between the outer lens portion 200 and the light source portion 300.

In an embodiment, the light-blocking portion 400 may include a coating layer 401 applied to the first surface 200*a* of the outer lens portion 200. The coating layer 401 may have the same color as the vehicle body 1. In another embodiment, the light-blocking portion 400 may include a film 402 insert-molded onto the first surface 200*a* of the outer lens portion 200. The film 402 may have the same color as the vehicle body 1.

The light-blocking portion 400 may include a non-transmissive portion 410 and a light-transmitting portion 420.

The non-transmissive portion 410 may block light to prevent light emitted from the light source portion 300 or an external light source from passing through the outer lens portion 200.

The light-transmitting portion 420 may be disposed or provided on the non-transmissive portion 410. The light-transmitting portion 420 may be formed by laser etching or laser perforation of the non-transmissive portion 410. The light-transmitting portion 420 may allow light emitted from the light source portion 300 to pass therethrough.

In an embodiment, the light-transmitting portion 420 may be formed by laser etching or laser perforation of the coating layer 401 applied to the first surface 200*a* of the outer lens portion 200. In another embodiment, the light-transmitting portion 420 may be formed by laser etching or laser perforation of the film 402 insert-molded onto the first surface 200*a* of the outer lens portion 200.

The light-transmitting portion 420 may be formed inside the non-transmissive portion 410. In detail, the light-transmitting portion 420 may be formed between a central portion and an edge portion of the non-transmissive portion 410. The light-transmitting portion 420 may be formed along the perimeter of the non-transmissive portion 410.

A plurality of light-transmitting portions 420 may be provided. The plurality of light-transmitting portions 420 may be arranged or spaced concentrically and radially.

The light source portion 300 according to the present embodiment may include a first light source portion 310 and a second light source portion 320.

The first light source portion 310 may be positioned to face the light-transmitting portion 420 and emit light toward the light-transmitting portion 420.

The second light source portion 320 may be positioned to face the second portion 202 of the outer lens portion 200 and emit light toward the second portion 202, excluding the first portion 201 of the outer lens portion 200.

The inner lens portion 500 may be positioned between the outer lens portion 200 and the light source portion 300. The inner lens portion 500 may include a transmissive material that allows light emitted from the light source portion 300 to pass therethrough. The inner lens portion 500 may include a transparent lens or a color lens that has a surface treated in a specific color.

The inner lens portion 500 may include a first inner lens portion 510 and a second inner lens portion 520.

The first inner lens portion 510 may be positioned between the light-blocking portion 400 and the first light source portion 310. In detail, the first inner lens portion 510 may be positioned between the light-transmitting portion 420 and the first light source portion 310.

Figure 7:
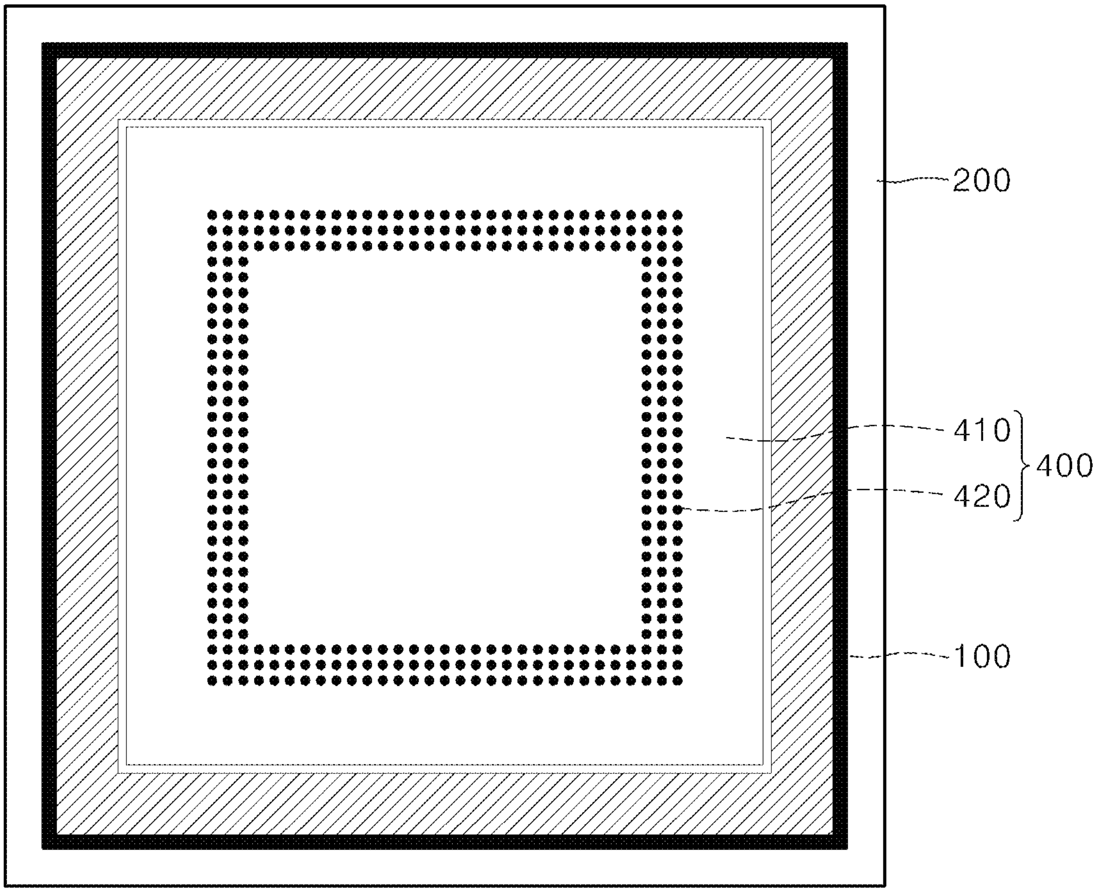
FIGS. 7 and 8 are front views schematically showing the operating state of a lighting device for a vehicle according to the first embodiment of the present disclosure.

FIG. 7 is a front view schematically showing the operating state of a lighting device for a vehicle according to the first embodiment of the present disclosure.

Referring to FIGS. 1 to 7, light emitted from the first light source portion 310 may pass through the first inner lens portion 510 and the light-transmitting portion 420 in sequence, and be visible from the outside through the outer lens portion 200. When the lighting device for a vehicle according to the present embodiment is mounted on the front portion 10 of the vehicle body 1, this lighting device may be recognized as the vehicle's position lamp. When mounted on the rear portion of the vehicle body 1, this lighting device may be recognized as the vehicle's tail lamp.

The second inner lens portion 520 may be positioned between the outer lens portion 200 and the second light source portion 320. In detail, the second inner lens portion 520 may be positioned between the second portion 202 of the outer lens portion 200 and the second light source portion 320.

Figure 8:
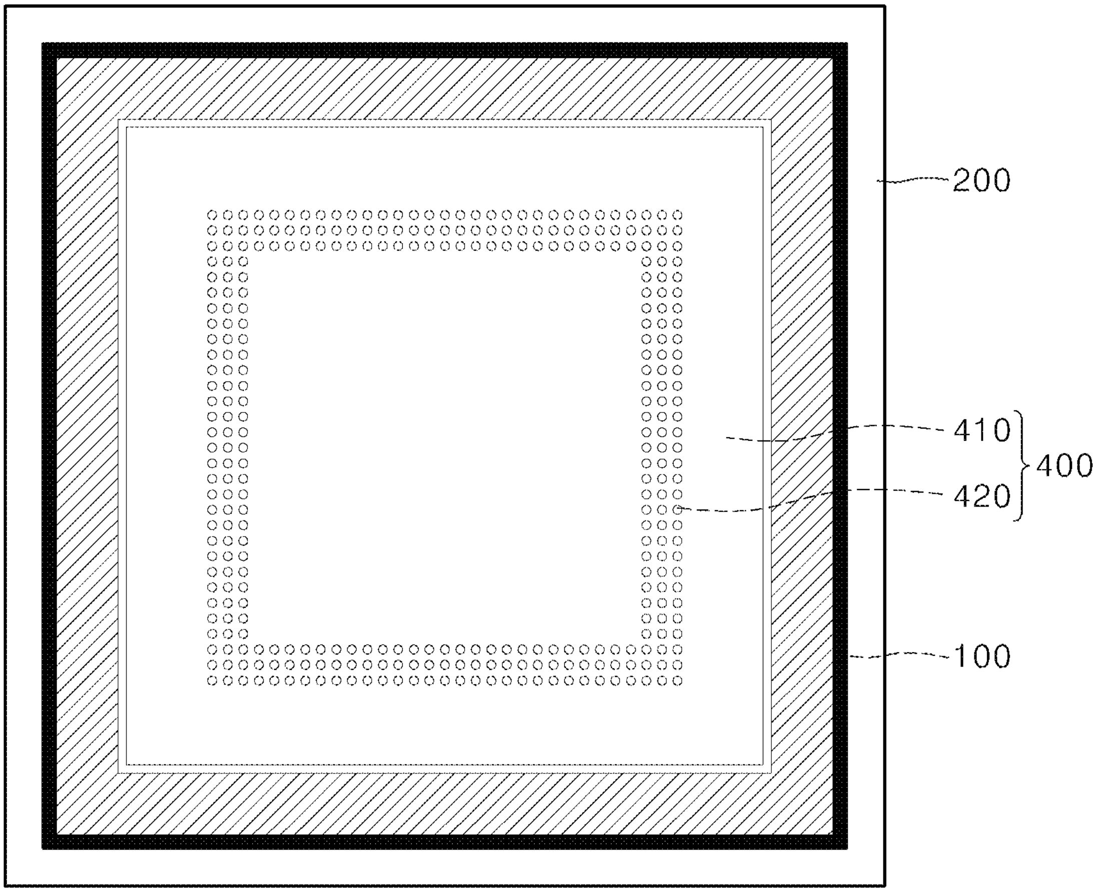

FIG. 8 is a front view schematically showing the operating state of a lighting device for a vehicle according to the first embodiment of the present disclosure.

Referring to FIGS. 1 to 6 and FIG. 8, light emitted from the second light source portion 320 may pass through the second inner lens portion 520 and the second portion 202 of the outer lens portion 200 in sequence, and be visible from the outside through the outer lens portion 200. When the lighting device for a vehicle according to the present embodiment is mounted on the front portion 10 of the vehicle body 1, this lighting device may be recognized as the vehicle's daytime running light (DRL). When mounted on the rear portion of the vehicle body 1, this lighting device may be recognized as the vehicle's stop lamp.

Figure 9:
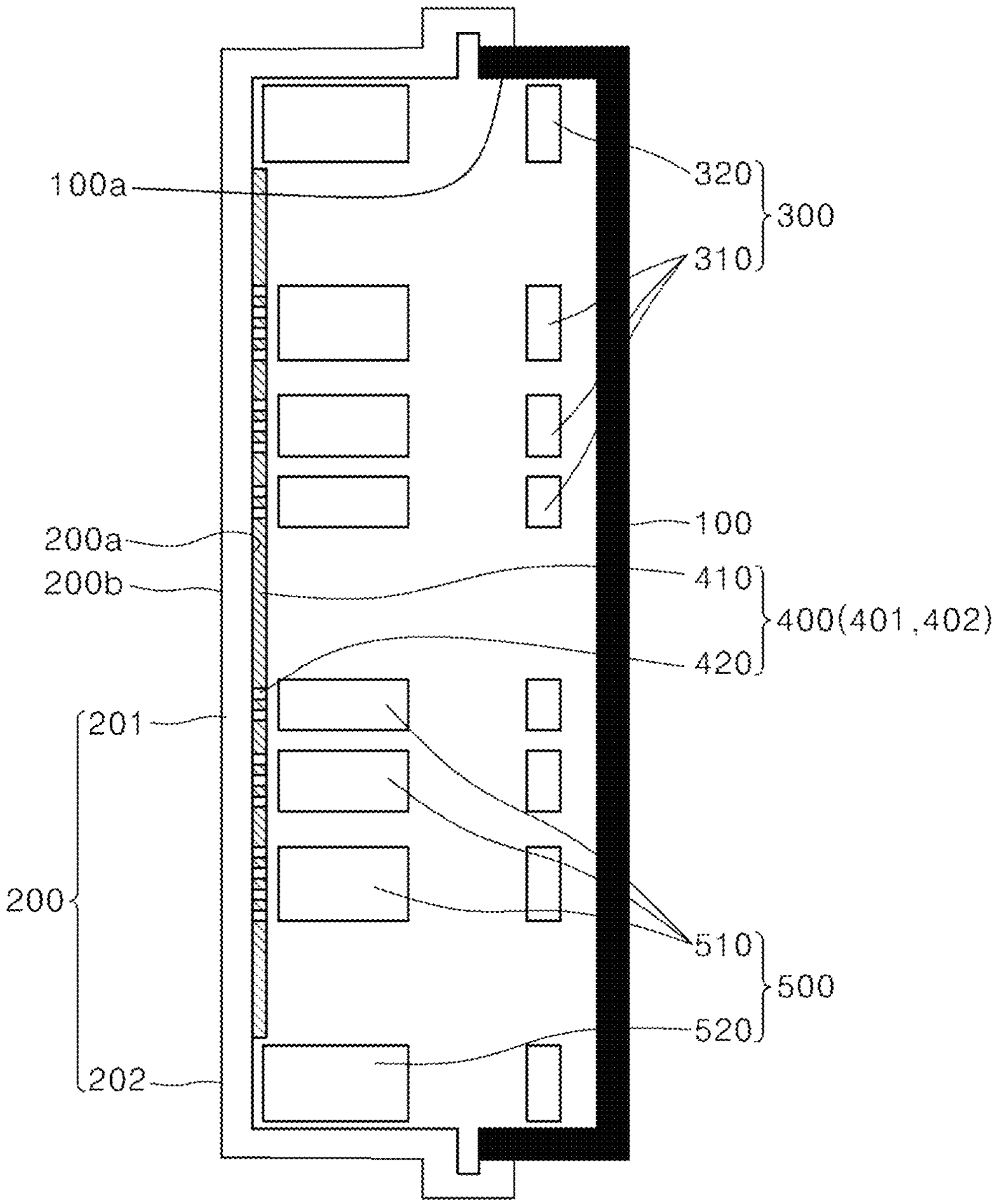
FIG. 9 is a schematic sectional view of one side of a lighting device for a vehicle according to the first embodiment of the present disclosure.
Figure 10:
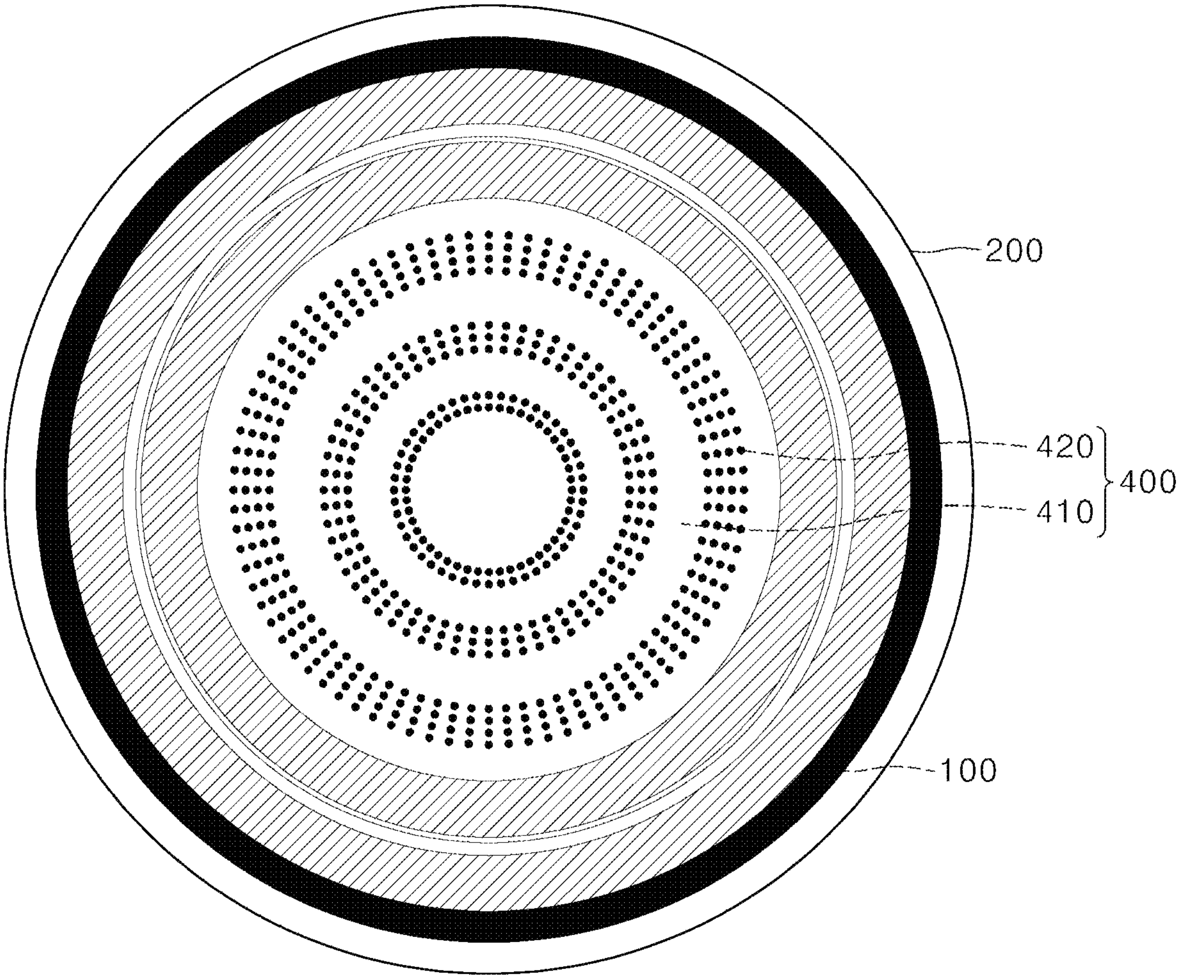
FIGS. 10 and 11 are front views schematically showing the operating state of a lighting device for a vehicle according to the first embodiment of the present disclosure.
Figure 11:
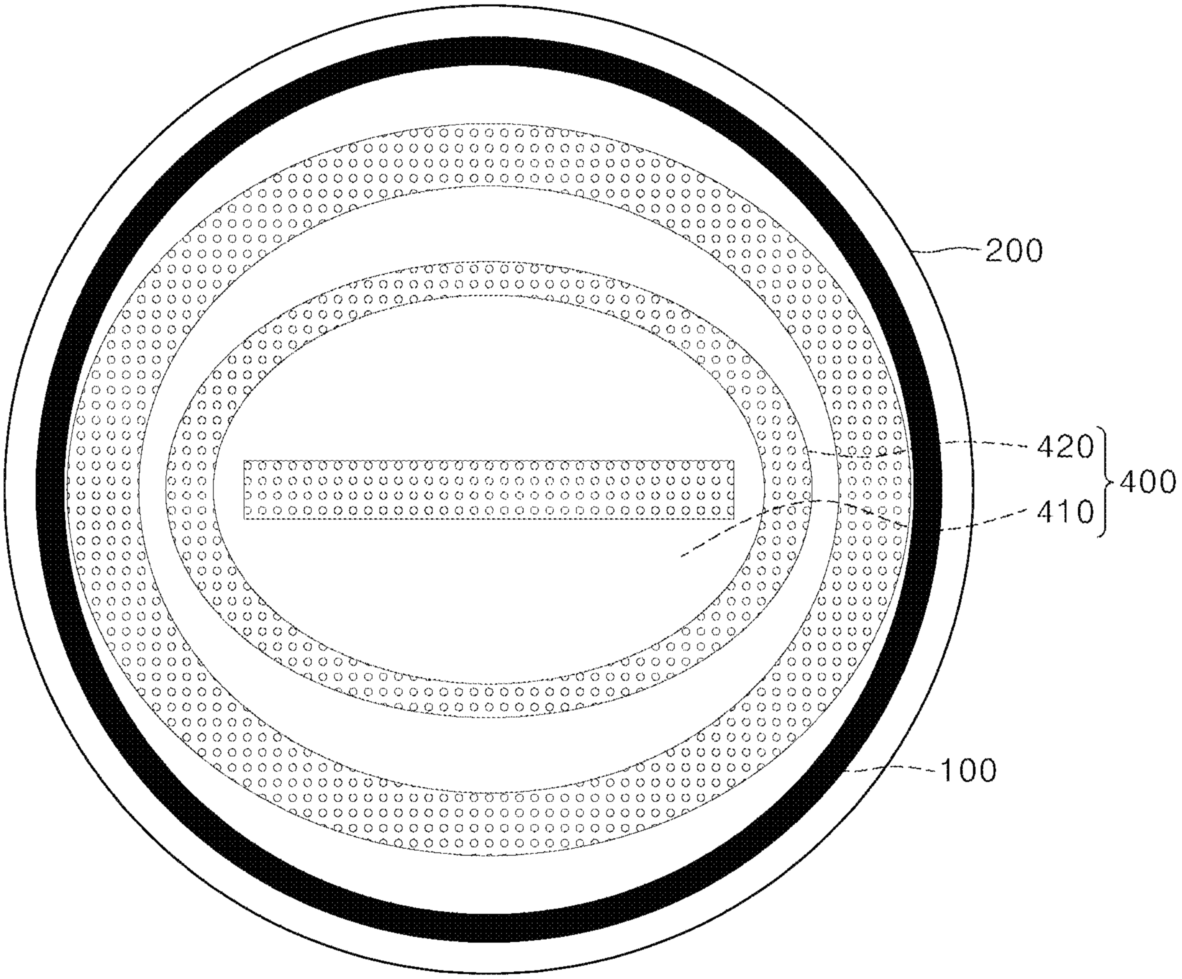
Figure 12:
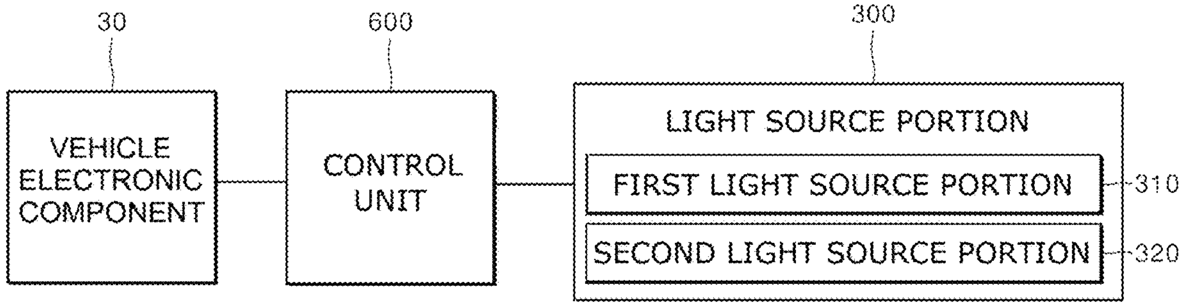
FIG. 12 is a block diagram showing the connection relationship between a control unit and each component in a lighting device for a vehicle according to the first embodiment of the present disclosure.

FIG. 9 is a schematic sectional view of one side of a lighting device for a vehicle according to the first embodiment of the present disclosure. FIGS. 10 and 11 are front views schematically showing the operating state of a lighting device for a vehicle according to the first embodiment of the present disclosure. FIG. 12 is a block diagram showing the connection relationship between a control unit and each component in a lighting device for a vehicle according to the first embodiment of the present disclosure.

Referring to FIGS. 1 to 12, the lighting device for a vehicle according to the embodiment of the present disclosure may further include a control unit 600. The control unit 600 may be electrically connected to the light source portion 300 and electrically connected to the vehicle electronic components 30.

The control unit 600 may receive operating signals from the vehicle electronic component 30 and control the light source portion 300. The control unit 600 may control the turning on (ON) or turning off (OFF) operation of the first light source portion 310 and the turning on (ON) or turning off (OFF) operation of the second light source portion 320.

The vehicle electronic component may refer to driving systems including a starter, charging system, ignition system, Engine Management System (EMS), Electronic Control Transmission (ETC) System, Trans-Axle Control System, and Electronic Control 4 Wheel Drive System, safety systems including an Anti-lock Brake System, Automatic Braking System, Electronic Control Suspension System, Electronic Power Steering System, Front & Back Warning System, Adaptive Front Light System (AFS), Tire Pressure Warning System (TPWS), Before Service Warning System (BSWS), and airbags (Supplemental Restraint System), and convenience systems including a lighting system, instrument system, Body Control System, Automatic Temperature Control System, Air Quality System (AQS), Audio & Video (AV) System, sensor devices, smart keys, and trip computers.

Referring to FIGS. 10 and 12, when an operation signal is received from the vehicle electronic component 30 responsible for operating the vehicle's ignition ON/OFF, the control unit 600 may control the ON/OFF operation of the light source portion 300 to implement a welcome mode or a goodbye mode of the vehicle based on the vehicle's ignition ON/OFF signal.

For example, when an operation signal from the vehicle electronic component 30, generated by a passenger turning the ignition ON, is received by the control unit 600, the control unit 600 may control the ON/OFF operation of the light source portion 300 such that a plurality of first light source portions 310, spaced concentrically and radially in the housing portion 100, and the second light source portion 320, positioned around the periphery of the first light source portions 310, are sequentially turned on and off repeatedly in the central or radial direction of the housing portion 100 to give a visual impression of ignition activation, thereby signaling the vehicle's movement to nearby vehicles and pedestrians.

Conversely, when an operation signal from the vehicle electronic component 30, generated by a passenger turning the ignition OFF, is received, the control unit 600 may control the ON/OFF operation of the light source portion 300 such that the light source portion 300 is sequentially turned on and off repeatedly in the central or radial direction of the housing portion 100.

Referring to FIGS. 10 and 12, when an operation signal is received from the vehicle electronic component 30 responsible for detecting external illumination of the vehicle, the control unit 600 may control the ON/OFF operation of the light source portion 300 to implement a daytime driving mode or a nighttime driving mode of the vehicle based on the illumination value received from the vehicle electronic component 30.

For example, if the illumination value received from the vehicle electronic component 30 responsible for detecting external illumination of the vehicle is below a set value, the control unit 600 may control the ON/OFF operation of the light source portion 300 such that the light source portion 300 is sequentially turned on and off repeatedly in the central direction of the housing portion 100 to signal the vehicle's transition to a nighttime driving mode to nearby vehicles and pedestrians.

Conversely, if the illumination value received from the vehicle electronic component 30 responsible for detecting external illumination of the vehicle is above a set value, the control unit 600 may control the ON/OFF operation of the light source portion 300 such that the light source portion 300 is sequentially turned on and off repeatedly in the radial direction of the housing portion 100 to signal the vehicle's transition to a daytime driving mode to nearby vehicles and pedestrians.

Referring to FIGS. 11 and 12, when an operation signal is received from the vehicle electronic component 30 responsible for detecting a distance between a pedestrian outside the vehicle and the vehicle, the control unit 600 may control the ON/OFF operation of the light source portion 300 to indicate the vehicle's stop state.

For example, when an operation signal from the vehicle electronic component 30, generated by the proximity or distance change between nearby pedestrians and vehicles, is received, the control unit 600 may control the ON/OFF operation of the light source portion 300 such that the light source portion 300 is sequentially turned on and off repeatedly in the central or radial direction of the housing portion 100 to signal the vehicle's transition from a stop state to a yield state or from a yield state to a stop state.

Figure 13:
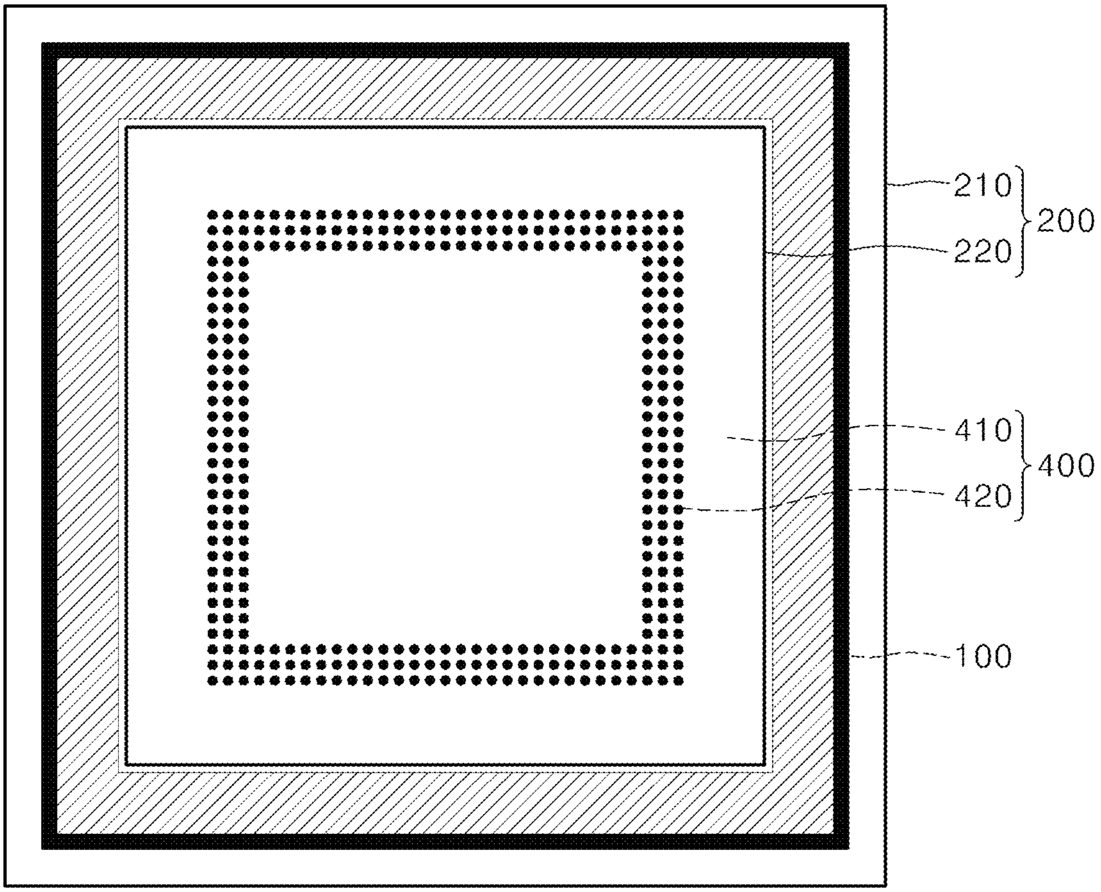
FIG. 13 is a front view schematically showing a lighting device for a vehicle according to a second embodiment of the present disclosure.
Figure 14:
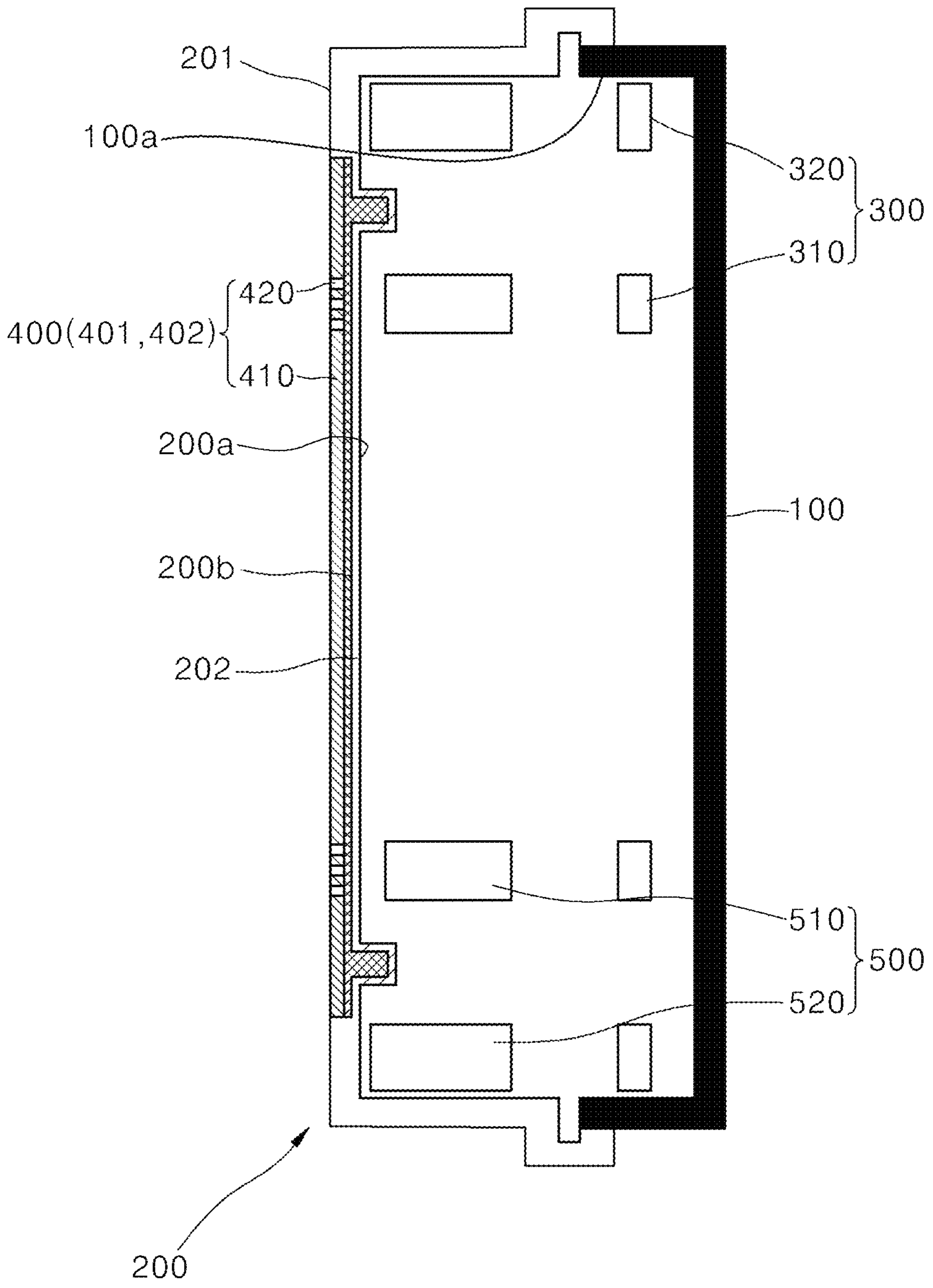
FIG. 14 is a sectional view of one side of FIG. 13.
Figure 15:
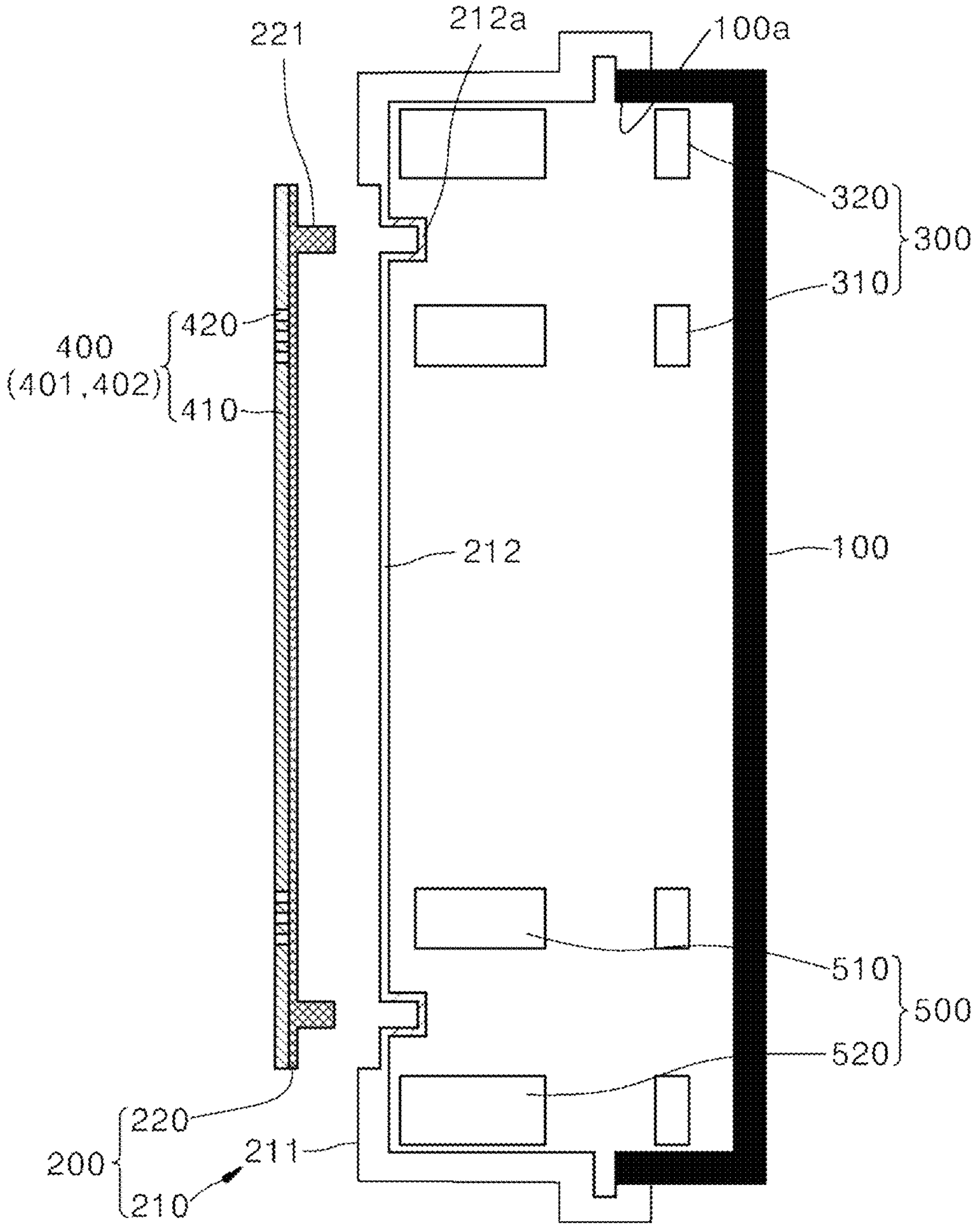
FIG. 15 is an exploded view of FIG. 14.

FIG. 13 is a front view schematically showing a lighting device for a vehicle according to a second embodiment of the present disclosure. FIG. 14 is a sectional view of one side of FIG. 13. FIG. 15 is an exploded view of FIG. 14.

Referring to FIGS. 13 to 15, a lighting device for a vehicle according to a second embodiment of the present disclosure may include a housing portion 100, an outer lens portion 200, a light source portion 300, a light-blocking portion 400, an inner lens portion 500, and a control unit 600.

In describing the lighting device for a vehicle according to the second embodiment of the present disclosure, only a different embodiment of the outer lens portion 200 and the light-blocking portion 400 in the lighting device for a vehicle according to the first embodiment of the present disclosure will be described.

The remaining components of the lighting device for a vehicle according to the second embodiment of the present disclosure may be understood as the same as those described for the lighting device for a vehicle according to the first embodiment of the present disclosure.

The outer lens portion 200 may include a first outer lens portion 210 and a second outer lens portion 220.

The first outer lens portion 210 may include a lens body portion 211 and a lens mounting portion 212.

The lens body portion 211 may be coupled to the housing portion 100. The lens body portion 211 may cover an opening 100*a* disposed or provided on the front of the housing portion 100.

The lens mounting portion 212 may be disposed or provided on the lens body portion 211. The lens mounting portion 212 may be recessed on an outer surface of the lens body portion 211, which faces the front or rear of the vehicle. The lens mounting portion 212 may be formed in a central portion of the lens body portion 211, excluding an edge portion of the lens body portion 211. The second outer lens portion 220 may be mounted on the lens mounting portion 212.

The lens mounting portion 212 may have a coupling groove portion 212*a*. The coupling groove portion 212*a* may be recessed on an outer surface of the lens mounting portion 212, which faces in a direction where the second outer lens portion 220 is positioned. The coupling groove portion 212*a* may be formed along the perimeter of the lens mounting portion 212.

The second outer lens portion 220 may be coupled to the first outer lens portion 210. The second outer lens portion 220 may be coupled to the lens body portion 211. The second outer lens portion 220 may have a smaller area than the lens body portion 211. The second outer lens portion 220 may be mounted on the lens mounting portion 212. The second outer lens portion 220 may have the light-blocking portion 400.

The second outer lens portion 220 may have a coupling protrusion portion 221. The coupling protrusion portion 221 may be formed to protrude from an outer surface of the second outer lens portion 220, which faces in a direction where the lens body portion 211 of the first outer lens portion 210 is positioned. The coupling protrusion portion 221 may be inserted into the coupling groove portion 212*a* formed in the lens mounting portion 212. The coupling protrusion portion 221 may be formed in the shape of a hook and securely hooked inside the coupling groove portion 212*a*. The coupling protrusion portion 221, inserted into the coupling groove portion 212*a*, may be secured to the coupling groove portion 212*a* using a coupling piece.

The light-blocking portion 400 may be disposed or provided on a second surface 200*b* of the outer lens portion 200. The light-blocking portion 400 may be disposed or provided on the second outer lens portion 220. The light-blocking portion 400 may be exposed to the outside. The light-blocking portion 400 may have the same area as the second outer lens portion 220. The light-blocking portion 400 may be integrally provided on the second outer lens portion 220.

In the lighting device for a vehicle according to the embodiment of the present disclosure, the light-blocking portion 400, in the form of the coating layer 401 or the film 402 with the same color as the vehicle body 1, is integrated with the first portion 201 of the outer lens portion 200, and the light-transmitting portion 420 is formed by laser etching or laser perforation on the light-blocking portion 400, thereby implementing a hidden lighting design.

Although the present disclosure has been described with reference to the embodiments shown in the drawings, these are merely exemplary, and those skilled in the art will appreciate that various modifications and other equivalent embodiments can be made from these embodiments disclosed herein. Thus, the true technical scope of the disclosure should be defined by the following claims.

What is claimed is:

1. A lighting device for a vehicle, comprising:
a housing unit having an opening;
an outer lens unit coupled to the housing unit and configured to cover the opening of the housing unit;
a light source unit housed at the housing unit and configured to emit light toward the outer lens unit; and
a light-blocking unit disposed over the light source unit and configured to partially block the light emitted from the light source unit,
wherein the outer lens unit comprises:
a first outer lens portion coupled to the housing unit and covering the opening of the housing unit; and
a second outer lens portion disposed on the first outer lens portion and including the light-blocking unit.

2. The lighting device of claim 1, wherein the light-blocking unit has a same color as a vehicle body of the vehicle.

3. The lighting device of claim 1, wherein the light-blocking unit is smaller than the outer lens unit.

4. The lighting device of claim 3, wherein:
the outer lens unit has a first portion, and
the light-blocking unit is disposed on the first portion of the outer lens unit.

5. The lighting device of claim 4, wherein the light-blocking unit comprises:
a non-transmissive portion configured to block the light emitted from the light source unit from passing through; and
a light-transmitting portion disposed on the non-transmissive portion and configured to allow the light emitted from the light source unit to pass through.

6. The lighting device of claim 5, further comprising a plurality of light-transmitting portions arranged concentrically and radially.

7. The lighting device of claim 5, wherein:
the outer lens unit further has a second portion different from the first portion, and
the light source unit comprises:
a first light source portion configured to emit the light toward the light-transmitting portion; and
a second light source portion configured to emit the light toward the second portion of the outer lens unit.

8. The lighting device of claim 7, wherein the light-blocking unit comprises a coating layer applied to (1) a first surface of the outer lens unit facing in a first direction or (2) a second surface positioned to face in a second direction opposite to the first direction.

9. The lighting device of claim 7, wherein the light-blocking unit comprises a film insert-molded onto (1) a first surface of the outer lens unit facing in a first direction or (2) a second surface positioned to face in a second direction opposite to the first direction.

10. The lighting device of claim 8, wherein the light-transmitting portion is formed by laser etching or laser perforation.

11. The lighting device of claim 1, wherein the light-blocking unit is disposed between the outer lens unit and the light source unit.

12. The lighting device of claim 1, further comprising an inner lens portion disposed between the outer lens unit and the light source unit.

13. The lighting device of claim 1, wherein the housing unit is mounted on a front portion or a rear portion of a vehicle body of the vehicle.

14. The lighting device of claim 1, further comprising a control unit electrically connected to (1) the light source unit and (2) one or more vehicle electronic components and configured to receive operating signals from the one or more vehicle electronic components and control the light source unit.

15. The lighting device of claim 14, wherein the control unit is configured to an ON/OFF operation of the light source unit to implement a welcome mode or a goodbye mode of the vehicle based on an ignition ON/OFF signal of the vehicle, in response to receiving an operation signal from one of the one or more vehicle electronic components responsible for operating an ignition ON/OFF operation of the vehicle.

16. The lighting device of claim 14, wherein the control unit is configured control an ON/OFF operation of the light source unit to implement a daytime driving mode or a nighttime driving mode of the vehicle based on an illumination value received from the one or more vehicle electronic components, in response to receiving an operation signal from one of the one or more vehicle electronic components responsible for detecting external illumination of the vehicle.

17. The lighting device of claim 14, wherein the control unit is configured to control an ON/OFF operation of the light source unit to indicate a stop state of the vehicle in response to receiving an operation signal from one of the one or more vehicle electronic components responsible for detecting a distance between a pedestrian outside the vehicle and the vehicle.

18. The lighting device of claim 1, wherein the first outer lens portion comprises:

a lens body portion coupled to the housing unit and covering the opening; and a lens mounting portion recessed on an outer surface of the lens body portion, wherein the second outer lens unit is mounted on the lens mounting portion, wherein the lens mounting portion has a coupling groove portion recessed on an outer surface thereof, and wherein the second outer lens unit has a coupling protrusion portion protruding from an outer surface thereof and inserted into the coupling groove portion.

19. A lighting device for a vehicle, comprising:

a housing unit having an opening;

an outer lens unit coupled to the housing unit and configured to cover the opening of the housing unit;

a light source unit housed at the housing unit and configured to emit light toward the outer lens unit; and a light-blocking unit disposed on the outer lens unit and configured to partially block the light emitted from the light source unit, wherein the outer lens unit comprises:

a first outer lens portion; and a second outer lens portion coupled to the first outer lens portion and including the light-blocking unit, and wherein the first outer lens unit comprises:

a lens body portion coupled to the housing unit and covering the opening; and a lens mounting portion recessed on an outer surface of the lens body portion, wherein the second outer lens unit is mounted on the lens mounting portion.

20. The lighting device of claim 19, wherein:

the lens mounting portion has a coupling groove portion recessed on an outer surface thereof, and the second outer lens unit has a coupling protrusion portion protruding from an outer surface thereof and inserted into the coupling groove portion.

* * * * *